(12) United States Patent
Abe et al.

(10) Patent No.: US 6,237,982 B1
(45) Date of Patent: May 29, 2001

(54) MOTORCYCLE COVERING

(75) Inventors: Karl-Heinz Abe, Kaufering; Georg Hack, Landshut; Rainer Rehschuh, Au, all of (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/393,703

(22) Filed: Sep. 10, 1999

(30) Foreign Application Priority Data

Sep. 11, 1998 (DE) ............................................. 198 41 747

(51) Int. Cl.$^7$ ...................................................... B62J 17/00
(52) U.S. Cl. ........................................ 296/78.1; 296/180.1
(58) Field of Search ................................ 296/78.1, 77.1, 296/180.1; 180/210

(56) References Cited

U.S. PATENT DOCUMENTS

| D. 406,801 | 3/1999 | Robb et al. . | |
|---|---|---|---|
| 3,979,147 | 9/1976 | Kelley . | |
| 4,010,976 | * 3/1977 | Shields | 296/78.1 |
| 4,130,315 | * 12/1978 | Shields | 296/78.1 |
| 4,198,093 | 4/1980 | Muth et al. | 296/78.1 |
| 5,222,752 | * 6/1993 | Hewitt | 296/78.1 |
| 5,330,029 | 7/1994 | Yoshimura et al. . | |

FOREIGN PATENT DOCUMENTS

| 26 24 851 | 12/1977 | (DE) . | |
|---|---|---|---|
| 4-201792 | 7/1992 | (JP) . | |
| 404287784 | * 10/1992 | (JP) | 296/78.1 |
| 405050966 | * 3/1993 | (JP) | 296/78.1 |
| 406024373 | * 2/1994 | (JP) | 296/78.1 |
| 406048344 | * 2/1994 | (JP) | 296/78.1 |
| 406144323 | * 5/1994 | (JP) | 296/78.1 |

* cited by examiner

*Primary Examiner*—D. Glenn Dayoan
(74) *Attorney, Agent, or Firm*—Evenson, McKeown, Edwards & Lenahan, P.L.L.C.

(57) ABSTRACT

A motorcycle covering has a device for influencing a water flow which guides rain water taken along by an air flow on an outer surface of a motorcycle covering. This device assures that the rain water, after its detachment from the motorcycle covering, does not hit a driver and/or passenger. At least a partial surface of the motorcycle covering is provided with at least one rib which projects toward the outside and which, viewed in the direction of a longitudinal axis of a motorcycle, guides water from the front toward the rear and, viewed in the direction of a transverse axis of the motorcycle, guides water from the inside to the outside such that, after detachment of the water from the motorcycle covering, the water moves at least past partial regions of the driver and/or of the passenger.

10 Claims, 2 Drawing Sheets

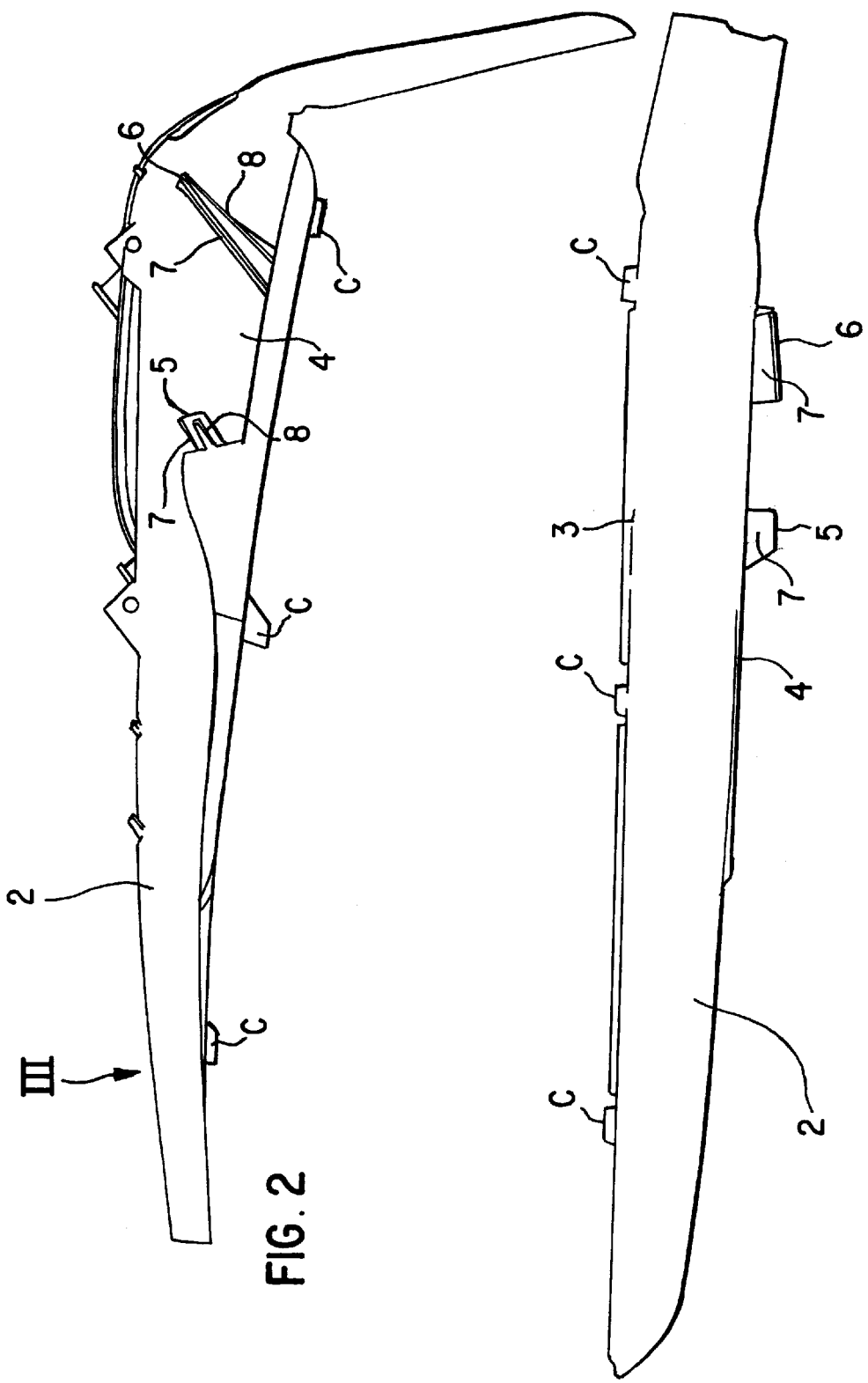

MOTORCYCLE COVERING

BACKGROUND AND SUMMARY OF THE INVENTION

This application claims the priority of German patent application 198 41 747, filed Sep. 11, 1998, the disclosure of which is expressly incorporated by reference herein.

The invention relates to a motorcycle covering having a device for influencing a water flow which guides rain water taken along by an air flow on an outer surface of the motorcycle covering, so that this rain water, after its detachment from the motorcycle covering, does not hit a driver and/or passenger.

German Patent Document DE 26 24 851 describes a motorcycle covering which, among other things, has an edge bead on the edges facing the driver, which edge bead is rounded and pulled toward the outside. The edge bead changes in its cross-section approximately tangentially into the interior surface of the covering. It influences the air flowing over the outer surface of the covering, in the event of its detachment from the edge of the covering, such that rain water taken along by the air flow from the outer surface does not hit the driver.

The construction of such an edge bead is not possible in the case of every covering part. On the one hand, it may have an aerodynamically disadvantageous effect; on the other hand, requirements with respect to the appearance of the motorcycle may stand in the way of constructing an edge bead at some points of the covering.

It is therefore an object of the invention to provide another and different device for influencing a water flow which guides rain water taken along by an air flow on an outer surface of a motorcycle covering, so that this rain water, after its detachment from the motorcycle covering, does not hit a driver and/or passenger.

According to the invention, this object is achieved by providing an arrangement of the above mentioned type, wherein a motorcycle covering has a device for influencing a water flow which guides rain water taken along by an air flow on an outer surface of the motorcycle covering, so that this rain water, after its detachment from the motorcycle covering, does not hit a driver and/or passenger, wherein at least one partial surface of the motorcycle covering is provided with at least one rib respectively which projects toward the outside and which, viewed in a direction of a longitudinal axis of a motorcycle, guides water from a front toward a rear and, viewed in a direction of a transverse axis of the motorcycle, guides water from the inside to the outside such that, after its detachment from the motorcycle covering, the water moves at least past partial regions of the driver and/or of the passenger.

According to preferred embodiments of the invention, at least a partial surface of a motorcycle covering is provided with at least one rib respectively which projects toward the outside and which, viewed in the direction of a longitudinal axis of a motorcycle, guides water from the front toward the rear and, viewed in the direction of a transverse axis of the motorcycle, guides water from the inside to the outside such that, after its detachment from the motorcycle covering, it moves at least past partial regions of the driver and/or of the passenger.

A rib projecting toward the outside on the motorcycle covering has the advantage that it can not only be mounted on the edge of the covering but at any point at which it is necessary to guide rain water taken along by an air flow on the outer surface of the motorcycle covering in such a manner that, after its detachment from the motorcycle covering, it moves at least past partial regions of the driver and/or of the passenger. Ribs which can be mounted at any necessary point of the motorcycle covering have the additional advantage that they can be shaped to match the appearance of the motorcycle.

Additional advantageous features of preferred embodiments of the invention include provisions of one rib on partial surfaces of the motorcycle covering which extend essentially horizontally and/or whose surface points essentially downward.

Particularly in the case of horizontally extending surfaces of the motorcycle covering, much water accumulates in rainy weather, to which splashing water is added which is then thrown at downwardly directed surfaces. A rib which, viewed in the direction of a longitudinal axis of the motorcycle, extends from the front toward the rear and, viewed in direction of a transverse axis of the motorcycle, extends from the inside to the outside according to certain preferred embodiments of the invention, is therefore very advantageous for deflecting water, specifically in the lower area of a horizontally extending covering part.

In the case of some motorcycle coverings of newer models, so-called buffer protecting strips are mounted. These strips cover a roll bar which extends, for example, on the right and on the left, toward the side, and therefore include the roll bar in the structure of the motorcycle covering. In order to generate a low drag, these buffer protecting strips partially have essentially horizontally extending surfaces which protrude in front of the driver to the side out of the contour course of additional motorcycle covering parts. If ribs are situated on this buffer protecting strip, on the bottom on an essentially horizontally extending surface, according to certain preferred embodiments of the invention, this has the advantage that they keep an area in front of the driver, where a lot of splashing water may occur, free of water. Advantageously, the number of ribs is dimensioned according to the amount of splashing water and also their slope. In the case of ribs extending from the front interior to the rear exterior, this slope can then form an angle with respect to a longitudinal vehicle axis, which amounts to between 10 degrees and 80 degrees.

Other objects, advantages and novel features of the present invention will become apparent from the following detailed description of the invention when considered in conjunction with the accompanying drawings.

BRIEF DESCRIPTION OF THE DRAWINGS

FIG. 2 is a view from below of the buffer protecting strip as seen in the direction of arrow II in FIG 1; and FIG. 3 is a lateral view of the buffer protecting strip as seen in the direction of arrow III in FIG. 2.

DETAILED DESCRIPTION OF THE DRAWINGS

Figure 1:
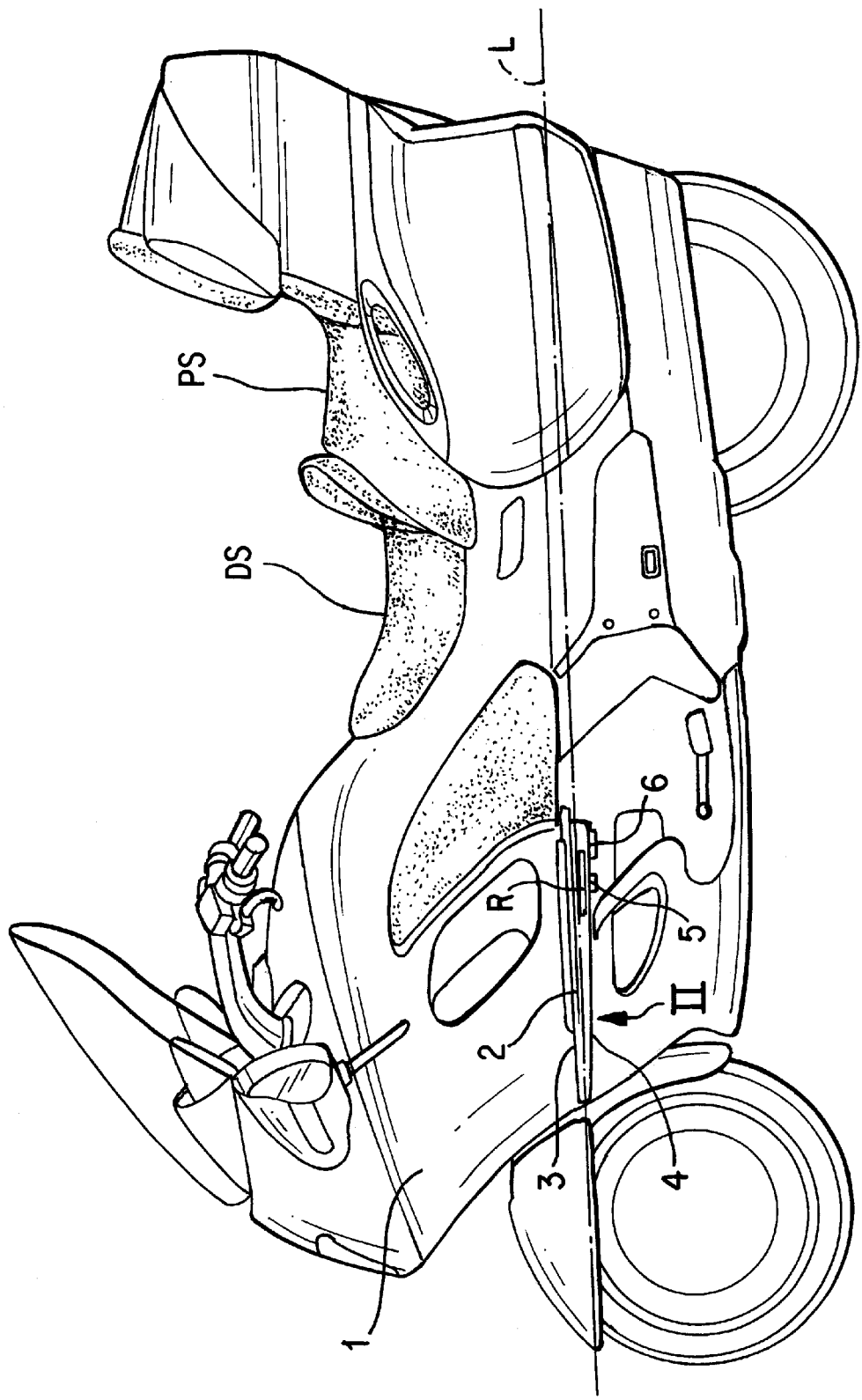
FIG. 1 is a schematic side view of a covered motorcycle with a buffer protecting strip and ribs, construed according to a preferred embodiment of the invention.

According to FIG. 1, a motorcycle is provided with a motorcycle covering 1. A partial surface of the motorcycle covering 1 is formed by a buffer protecting strip 2 which covers a roll bar R, schematically illustrated in FIG. 1 but otherwise not visible, which projects in front of the not shown driver toward the side out of the contour course of the other motorcycle covering parts. For this reason, the buffer protecting strip 2 has relatively large, essentially horizontally extending, upward and downward directed outer surfaces, specifically an upper outer surface 3 and a lower outer surface 4. In FIGS. 2 and 3 connecting structure C for the buffer protection strip structure is schematically depicted. It should be understood that various types of connecting structure C can be used to connect strip 2 to the outer covering.

On the lower outer surface 4, two ribs are constructed, specifically a forward rib 5 and a rearward rib 6. The two ribs 5, 6 extend at a different angle with respect to the longitudinal motorcycle axis, viewed in the direction of the longitudinal motorcycle axis, from the front to the rear, and, viewed in the direction of a transverse axis of the motorcycle, from the interior to the exterior. Both ribs protrude from the lower outer surface 4 of the buffer protecting strip 2 to the outside and therefore define an angle with respect to the longitudinal axis L of the motorcycle which amounts to from 30 to 60 degrees, in which case a forwardly directed water deflecting surface 7 of the respective rib 5, 6 defines a different angle with respect to the longitudinal axis of the motorcycle than a surface 8 directed toward the rear, to the driver (FIG. 2). The buffer protection strip is configured to guide water from the front toward the rear of the motorcycle so that the water moves outside of and past the driver and passenger which in use sit in the driver seat DS and the passenger seat PS.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Motorcycle covering for influencing a flow of water taken along by an air flow on an outer surface thereof so that the water, after its detachment from the motorcycle covering, does not hit a driver and/or passenger, comprising:

a buffer protecting strip having an essentially horizontally extending upper outer surface and an essentially horizontally extending lower outer surface, connecting structure provided on the buffer protecting strip to connect the buffer protecting strip in place, a forward rib and a rearward rib protruding from said lower outer surface of said buffer protecting strip, each rib defining a forwardly directed water deflecting rib surface extending at an acute angle with respect to a longitudinal axis of a motorcycle so as to guide the water, after its detachment from the motorcycle covering, past partial regions of the driver and/or of the passenger.

2. Motorcycle covering according to claim 1, wherein each rib is provided on said lower outer surface.

3. Motorcycle covering according to claim 1, wherein each rib is provided on said lower outer surface and said lower outer surface points essentially downward.

4. Motorcycle covering according to claim 1, wherein the buffer protecting strip defines a covering for a roll bar, the roll bar projecting in front of the driver out of a contour course of additional motorcycle parts.

5. Motorcycle covering according to claim 3, wherein the buffer protecting strip defines a covering for a roll bar, the roll bar projecting in front of the driver out of a contour course of additional motorcycle parts.

6. Motorcycle covering according to claim 4, wherein the ribs define an angle of between 10 degrees and 80 degrees with respect to the longitudinal axis of a motorcycle.

7. Motorcycle covering according to claim 5, wherein the ribs define an angle of between 10 degrees and 80 degrees with respect to the longitudinal axis of a motorcycle.

8. Motorcycle covering according to claim 1, wherein the buffer protecting strip is connected in place to lateral outer parts of the motorcycle covering.

9. Motorcycle covering according to claim 8, wherein the ribs are disposed laterally within a contour of the buffer protecting strip.

10. Motorcycle covering according to claim 9, wherein the ribs are integrally formed with the buffer protecting strip.

* * * * *